Figure 1:
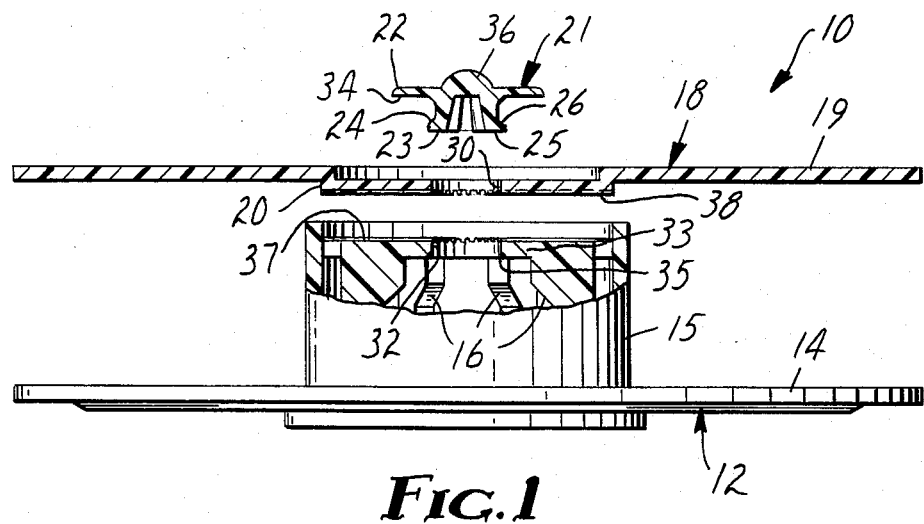

United States Patent [19]

Wulfing et al.

[11] Patent Number: 4,520,969
[45] Date of Patent: Jun. 4, 1985

[54] VIDEOCASSETTE TAPE SPOOL HAVING A WEAR BUTTON

[75] Inventors: James J. Wulfing, Afton; Robert M. Rood, Woodbury, both of Minn.

[73] Assignee: Minnesota Mining and Manufacturing Company, St. Paul, Minn.

[21] Appl. No.: 542,430

[22] Filed: Oct. 17, 1983

[51] Int. Cl.³ ............... B65H 75/18; G03B 1/04; G11B 15/32
[52] U.S. Cl. ................... 242/71.8; 242/199
[58] Field of Search ............ 242/71.8, 71.9, 118.4, 242/118.6, 118.61, 197, 199; 206/403–405, 493; 360/132, 137

[56] References Cited

U.S. PATENT DOCUMENTS

| | | | |
|---|---|---|---|
| 2,476,928 | 7/1949 | Thomas | 242/71.8 |
| 4,234,137 | 11/1980 | Watanabe et al. | 242/71.8 |
| 4,371,123 | 2/1983 | Watanabe | 242/71.8 |
| 4,452,404 | 6/1984 | Gelardi et al. | 242/71.8 |

FOREIGN PATENT DOCUMENTS

| | | |
|---|---|---|
| 0072517AE | 8/1982 | European Pat. Off. . |
| 3222632 | 1/1983 | Fed. Rep. of Germany . |
| 54-37123 | 3/1979 | Japan . |
| 54-70123 | 5/1979 | Japan . |
| 55-158080 | 11/1980 | Japan . |

Primary Examiner—Leonard D. Christian
Attorney, Agent, or Firm—Donald M. Sell; James A. Smith; David W. Anderson

[57] ABSTRACT

Videocassette tape spool, the wear button of which is a protuberance of a small plastic piece which may serve to lock the parts of the spool together. By using a small piece for the wear button, substantial savings in raw material can be realized since highly wear-resistant plastics tend to be quite expensive. The novel tape spool also can be assembled less expensively compared to tape spools now used in videocassettes.

8 Claims, 4 Drawing Figures

VIDEOCASSETTE TAPE SPOOL HAVING A WEAR BUTTON

FIELD OF THE INVENTION

The invention concerns videocassette tape spools which have wear buttons that ride against springs mounted on inner faces of the cassettes.

BACKGROUND ART

Each of the Betamax and VHS videocassettes has a pair of tape spools loosely positioned side-by-side within the cassette housing. When the cassette is inserted into a videotape recorder, a pair of spindles fit into interior teeth of the hubs of the spools and press the spools against a spring which is mounted in the cassette. The spring has two arms, each of which contacts a wear button on one of the tape spools.

The tape spool of a typical Betamax or VHS videocassette has two parts, each a single piece of plastic. The first piece includes a hub, one flange, and a wear button at the end of the hub opposite its flange. The second piece is a transparent plastic disk which provides the other flange and has a central opening through which the wear button protrudes. Typically the two pieces are ultrasonically welded together. Because the first piece includes the wear button, it must be molded of a plastic which is wear resistant and hence relatively expensive.

The compact VHS-C videocassette also has two tape spools, one of which is similar to the spools of the full-size VHS and is typically constructed in the same way.

After magnetic recording tape is wound into an assembled videocassette, visual inspection sometimes reveals a scratched transparent flange. When ultrasonically welded, the spool and wound tape would be discarded, because it would be impossible to replace only the scratched flange. U.S. Pat. No. 4,289,282 shows a videocassette tape spool which would permit a scratched transparent flange to be replaced.

DISCLOSURE OF THE INVENTION

The tape spool of the invention, like typical videocassette spools, comprises a flanged hub having a cylindrical tape-winding surface and a wear button projecting beyond the flanged hub at the axis of the spool. The novel tape spool differs from typical videocassette spools in that its wear button is a portion of a separate, small piece comprising (1) a collar having an inner face that fits flush against the hub at its axis, (2) at least two detents projecting from the inner face of the collar, which detents fit through a central opening in and lock against the hub, and (3) a protuberance on the outer face of the collar to serve as a wear button.

Because the separate piece which provides the wear button is small, it can be an expensive, wear-resistant plastic, but by using relatively low cost plastics for the remainder of the tape spool, the total cost of plastics for the novel tape spool can be lower than the cost of the plastics used in currently commercial videocassette tape spools.

The wear-button piece preferably has two detents, each having a circular periphery coaxial with that of the other and extending through an arc of at least 90°, with the hub opening through which they fit being circular so that the wear-button piece and the flanged hub need not be aligned during assembly.

In a first preferred embodiment of the invention, the tape spool consists of three pieces of plastic, the first being opaque and providing one flange and the cylindrical tape-winding surface of the hub. The second plastic piece is a transparent disk which completes the hub and provides the other flange, and the third is a separate small piece including the wear button. Detents of the wear-button piece fit through central openings in the hub portions of both the transparent disk and the opaque first piece and lock against the latter to hold the three pieces together as a tape spool that can readily be disassembled without disturbing a wound tape. This allows convenient replacement of its transparent disk if scratched.

In a second preferred embodiment of the invention, the tape spool also consists of three pieces of plastic, the first being an opaque flanged hub and the second being a transparent disk which completes the hub and provides the other flange. There is a snap fit between the opaque and transparent pieces. A separate small plastic piece which provides a wear button has detents that fit through a central opening or openings in and lock against the transparent disk. Like the first embodiment, the second embodiment can be disassembled without disturbing a wound tape.

Both the first and second embodiments lend themselves to automated assembly at less expense compared to the assembly expense of videocassette tape spools now on the market.

As are the wear-button-containing parts of typical videocassette spools, the small wear-button piece of the novel tape spool preferably is molded of an acetal resin, it being exceedingly wear resistant and tough. The flanged hub piece preferably is molded of acrylonitrile-butadiene-styrene (ABS) copolymer or high-impact polystyrene, both of which are strong and tough but less expensive than acetal resin or any equally wear-resistant plastic. The transparent disk, like those used in the prior art, is preferably styrene-acrylonitrile copolymer.

THE DRAWING

In the drawing

Figure 2:
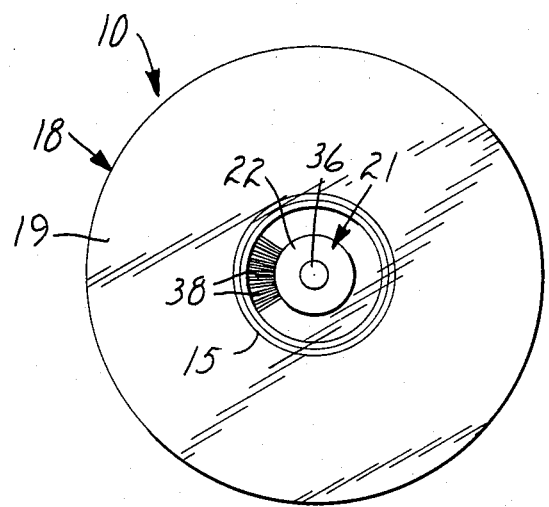
Figure 3:
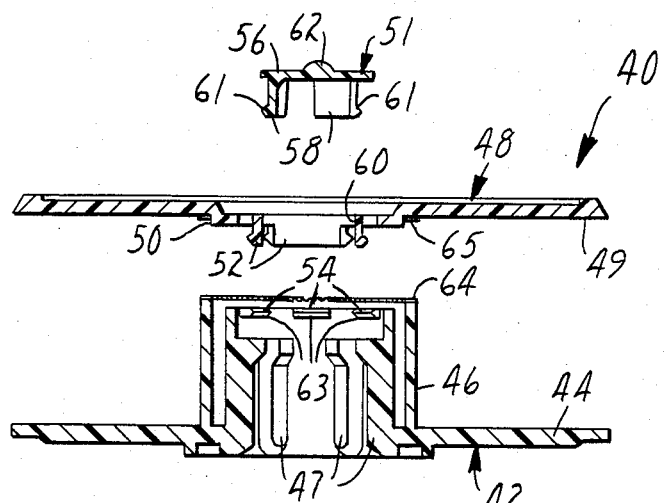
Figure 4:
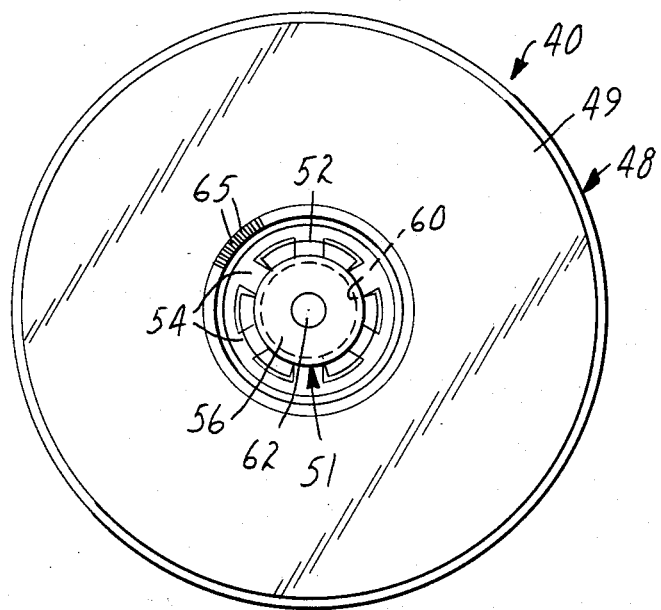

FIG. 1 schematically shows in axial cross section a disassembled 3-piece tape spool of the invention;

FIG. 2 is plan view of the assembled 3-piece spool of FIG. 1;

FIG. 3 schematically shows in axial cross section another disassembled 3-piece plastic tape spool of the invention; and FIG. 4 is a plan view of the assembled 3-piece spool of FIG. 3.

The tape spool 10 of FIGS. 1 and 2 consists of three pieces of plastic: (1) an opaque first piece 12 providing one flange 14 and the cylindrical tape-winding surface 15 and interior teeth 16 of the hub 14, (2) a transparent disk 18 providing a second flange 19 and a cylindrical offset 20 which completes the hub, and (3) a wear-button piece 21. The wear-button piece consists of a collar 22 and two detents 23 and 25 each having a circular periphery coaxial with that of the other and extending through an arc of about 120 degrees. Upon being assembled, the cylindrical offset 20 of the transparent disk 18 seats into a recess in the opaque piece 12 to restrict relative movement between the transparent disk 18 and the opaque first piece 12 in radial directions. The detents 24, 26 yieldingly fit through a circular central opening 30 in the cylindrical offset 20 and a circular central opening 32 in a radial web 33 of the opaque piece. Inclined planes 24, 26 on the detents 23, 25, respectively, interface with an inclined plane 35 on the lower surface of the radial web 33, creating a downward compressive force between the inner face 34 of the collar 22 and the outer face of the cylindrical offset 20. The outer face of the radial web 33 has serrations 37 which mesh with serrations 38 on the face of the cylindrical offset 20 to lock the first piece 12 and the transparent disk 18 against independent rotation. On the outer face of the collar is a protuberance 36 which serves as a wear button.

The plastic tape spool 40 of FIGS. 3 and 4 consists of three pieces: (1) an opaque piece 42 providing one flange 44 and the cylindrical tape-winding surface 46 and interior teeth 47 of the hub, (2) a transparent disk 48 providing a second flange 49 and a cylindrical offset 50 which completes the hub, and (3) a wear-button piece 51. Upon being assembled, the cylindrical offset 50, seats into a recess in the opaque piece 42. Projecting from the cylindrical offset 50 are three detents 52, two being shown, each having a circular periphery coaxial with those of the others and extending through about 90° of arc. The detents 52 yieldingly fit through a central circular opening defined by six small protrusions 54 in the opaque piece 42, thus locking the transparent disk 48 to the opaque piece.

The wear-button piece 51 consists of a collar 56 and three detents 58, two of which are shown, each extending through about 90° of arc. Upon being assembled, the detents 58 fit through a central circular opening 60 in the cylindrical offset 50 of the transparent disk 48. Inclined planes 61 on the detents 58 interface with the lower, inner edges of the transparent disk detents 52, creating a compressive force between the under face of the collar 56 and upper face of the cylindrical offset 50. This insures that the inner face of the collar 56 fits flush against the face of the cylindrical offset 50. Serrations 64 on the axial face of the opaque piece 42 mesh with serrations 65 on the under face of the flange 49 to prevent independent rotation. On the outer face of the collar 56 is a protuberance 62 which serves as a wear button.

I claim:

1. Tape spool for a tape cassette, which spool comprises a flanged hub having a cylindrical tape-winding surface and a wear button projecting beyond the flanged hub at the axis of the spool, wherein the improvement comprises:

a first piece including one flange and said hub, said hub including a radial wall defining a circular central opening;

a disk which completes said hub to provide the other flange and thereby define said flanged hub, said disk including a circular central opening coaxial with said first piece central opening; and a separate piece bearing said wear button and including a collar having an inner face which fits flush against said disk, and an outer face opposite said inner face; at least two detents projecting from said inner face of said collar and through said coaxial circular central openings in said disk and said first piece to lock to said radial wall of said hub with said disk interposed between said collar and said hub to retain said disk adjacent said hub; and a protuberance on said outer face of said collar which defines said wear button;

said central openings of said disk and said hub being circular to permit assembly of said disk to said hub and assembly of said separate piece to said hub through said disk without any particular radial orientation of said hub, disk or separate piece.

2. Tape spool as defined in claim 1 wherein said separate piece has two detents, each having a circular periphery coaxial with that of the other and extending through an arc of at least 90°.

3. Tape spool as defined in claim 2 wherein said disk has a cylindrical offset which is coaxial with its central opening and wherein said first piece has a recess in which said disk cylindrical offset nests to restrict relative movement between said disk and said first piece in radial directions.

4. Tape spool for a tape cassette, which spool comprises a flanged hub having a cylindrical tape-winding surface and a wear button projecting beyond the flanged hub at the axis of the spool, wherein the improvement comprises:

a first piece including one flange and said hub, said hub further including a radial wall defining a central opening;

a disk which completes said hub to provide the other flange and thereby define said flanged hub, said disk including a central opening and at least two detents projecting from one of its major surfaces and through said first piece central opening to lock against said first piece radial wall; and a separate piece bearing said wear button and including a collar having an inner face which fits flush against said disk, and an outer face opposite said inner face; at least two detents projecting from said inner face of said collar to lock against said disk; and a protuberance on said outer face of said collar which defines said wear button.

5. Tape spool as defined in claim 4 wherein said central openings of said first piece and said disk are circular and coaxial to permit assembly of said disk to said hub and assembly of said separate piece to said hub through said disk without any particular radial orientation of said hub, disk or separate piece.

6. Tape spool as defined in claim 4 wherein said disk has a cylindrical offset from which its detents project and wherein said first piece has a recess in which said disk cylindrical offset nests to restrict relative movement between said disk and said first piece in radial directions.

7. Tape spool as defined in claim 6 wherein said separate piece is acetal resin.

8. Tape spool as defined in claim 7 wherein said first piece is acrylonitrile-butadiene-styrene copolymer and said disk is styrene-acrylonitrile copolymer.

* * * * *